Figure 3:
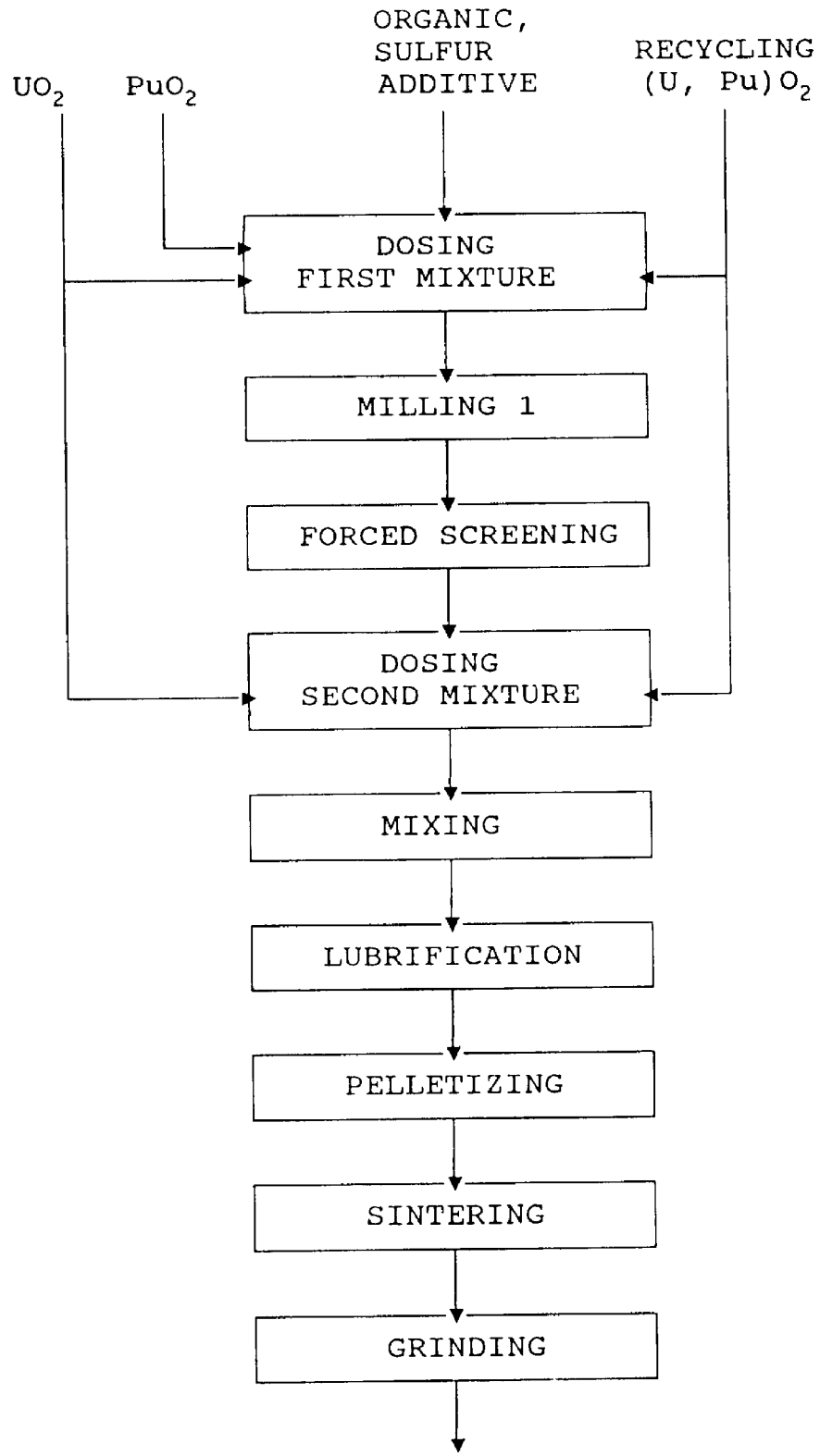

United States Patent
Bauer et al.

[11] Patent Number: 5,841,200
[45] Date of Patent: Nov. 24, 1998

[54] PROCESS FOR THE PRODUCTION OF NUCLEAR FUEL PELLETS BASED ON MIXED (U, PU)O₂ OXIDE WITH THE ADDITION OF AN ORGANIC, SULPHUR PRODUCT

[75] Inventors: Mireille Bauer, Manosque; Yves Marc, Aix eu Provence; Danielle DeMarc, Peyrolles; Monique Seiss, Manosque, all of France

[73] Assignees: Commissariat a l'Energie Atomique, Paris; Compagnie Generale des Matieres Nucleaires, Velizey Villacoublay, both of France

[21] Appl. No.: 689,521

[22] Filed: Aug. 9, 1996

[30] Foreign Application Priority Data

Aug. 25, 1995 [FR] France .................. 95 10088

[51] Int. Cl.⁶ ............ C21C 21/00; C01G 57/00
[52] U.S. Cl. ............ 264/0.5; 376/902; 252/640; 423/12
[58] Field of Search .............. 264/0.5; 252/640; 423/12; 376/902

[56] References Cited

U.S. PATENT DOCUMENTS

| 3,152,984 | 10/1964 | Winsche et al. ............ 264/0.5 |
| 3,856,622 | 12/1974 | Pollock et al. ............ 176/68 |
| 3,887,486 | 6/1975 | Googin et al. ............ 252/301.1 R |
| 4,269,728 | 5/1981 | Schweitzer et al. ............ 252/301.1 W |
| 4,314,952 | 2/1982 | Zawidzki ............ 264/0.5 |
| 4,687,601 | 8/1987 | Bachelard et al. ............ 252/838 |
| 4,985,183 | 1/1991 | Yato et al. ............ 264/0.5 |

FOREIGN PATENT DOCUMENTS 2 622 343  4/1989  France ............ G21C 3/62

OTHER PUBLICATIONS

Database WPI, Week 8920, Derwent Publications Ltd., London, GB; AN 87-187426 XP002004564 & JP-A-62 115 398 (Nippon Nuclear Fuel) 27 May 1987.

*Primary Examiner*—Peter A. Nelson
*Attorney, Agent, or Firm*—Pearne, Gordon, McCoy & Granger LLP

[57] ABSTRACT

Process for the production of nuclear fuel pellets based on mixed uranium and plutonium oxide having a specific plutonium content from a charge of $UO_2$ and $PuO_2$ powders by lubrification, pelletizing and sintering, in which a solid, sulphur, organic additive of the zwitterion type is incorporated into the mixture during the co-milling stage for the powders.

26 Claims, 10 Drawing Sheets

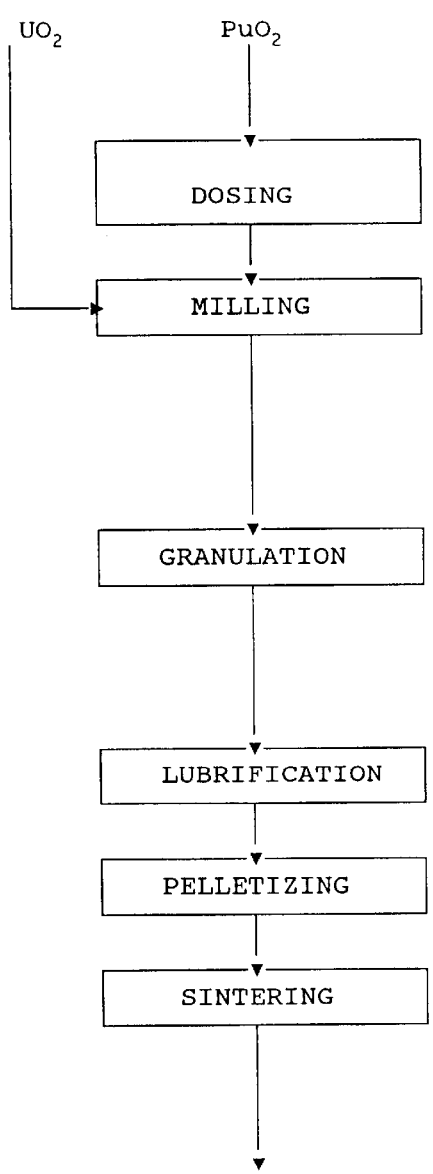
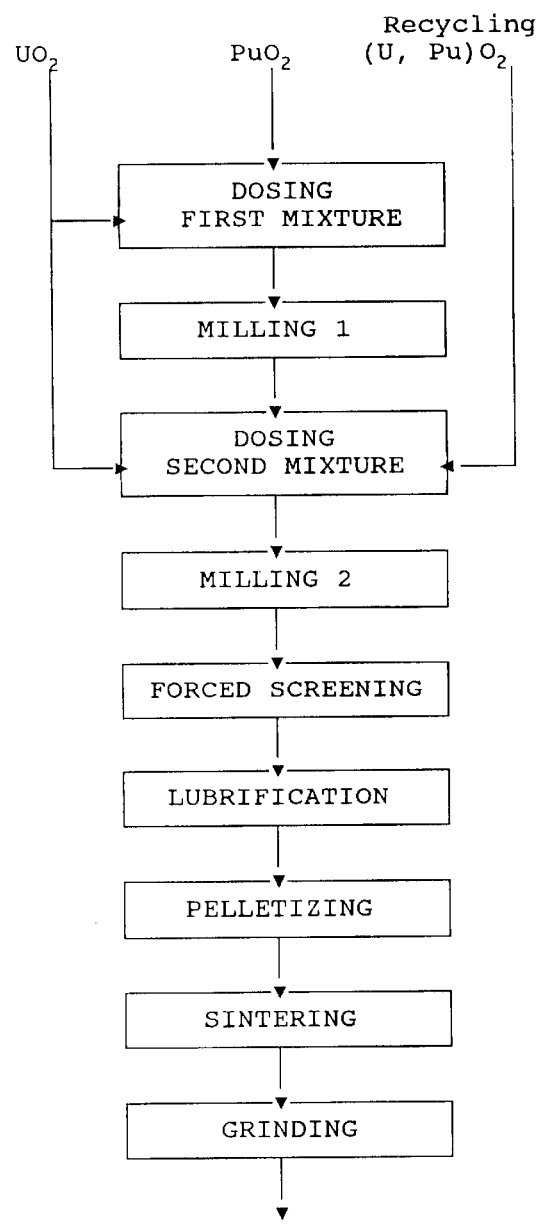
FIG. 1
FIG. 2

PROCESS FOR THE PRODUCTION OF NUCLEAR FUEL PELLETS BASED ON MIXED (U, PU)O$_2$ OXIDE WITH THE ADDITION OF AN ORGANIC, SULPHUR PRODUCT

The present invention relates to a process for the production of nuclear fuel pellets of the MOX type based on mixed oxide (U, Pu)O$_2$ usable in any type of reactor, especially water nuclear reactors and more particularly in pressurized water reactors.

More specifically, it relates to a process making it possible to obtain sintered nuclear fuel pellets having improved properties with respect to the microstructure of the pellet with the increase in the size of the grains of the material, whilst retaining a satisfactory dissolving aptitude in the solutions generally used for the reprocessing or irradiated nuclear fuels and a good dry grinding possibility.

Among the processes used up to now for the production of nuclear fuel pellets of this type, the document "Techniques de l'Ingénieur—Génie Nucléaire—B3630-1 á 3630-10" discloses a process which starts with a mixture of UO$_2$ and PuO$_2$ powders, which undergoes milling, compacting and granulation followed by pelletizing and sintering.

In this process, which is known as "direct co-milling", which is diagrammatically illustrated in FIG. 1, the starting product consists of UO$_2$ and PuO$_2$ powders mixed in the desired proportions to obtain the desired plutonium level, whilst taking account of the isotopic characteristics and the metaloxide ratios of the different batches of powders used. Thus, in the first dosing stage, the desired quantities of the UO$_2$ and PuO$_2$ powders are mixed to obtain the specified plutonium level. This is followed by the second milling stage in cylindrical jars containing hard material balls in order to destroy the powder agglomerates, intimately mix the constituents and fragment the powder particles, whilst thus increasing their sintering aptitude. This is followed by the third granulation stage consisting of compacting the previously obtained powders, then breaking up the compacts obtained in a crusher and screening them to obtain the desired grain size, whilst transforming the powder into a denser and roughly spherical product. This operation is followed by the lubrification stage consisting of adding a lubricant such as calcium or zinc stearate to the granules. This is followed by pelletizing by compression at constant pressure of the granules in alternating or rotary presses, followed by sintering for densifying the pellets and obtaining the final characteristics.

This process suffers from the major disadvantage of giving nuclear fuel pellets, whose internal structure does not give them an adequate aptitude for grinding as a result of cracking and appearance deficiencies.

Moreover, the thus obtained sintered pellets, although meeting the requisite specifications, cause certain problems in order to bring about the complete dissolving of the plutonium during irradiated pellet reprocessing operations. Thus, in a nuclear reactor, said pellets are subject to high temperatures, which leads to the obtaining of difficultly dissolvable, refractory plutonium oxide.

FR-A-2 622 343 describes a process known as the "double co-milling process", which consists of an improvement and a variant to the aforementioned process and which is diagrammatically shown in FIG. 2, where pelletizing, followed by sintering takes place to a charge of UO$_2$ and PuO$_2$ powders constituted by particles having grain sizes equal to or below 250 $\mu$m and prepared in the following way: dosing a first mixture of powders (mother mixture) having a plutonium content higher than the specified content and UO$_2$, PuO$_2$ and optionally recycling powders which undergo a first milling, followed by the dosing of a second powder mixture by adding UO$_2$ and optionally recycling powders. This second mixture undergoes milling for a limited time and screening through a screen having openings smaller or equal to 250 $\mu$m.

This process makes it possible to obtain pellets, whose aptitude for dry grinding is combined with a good aptitude for dissolving at the time of reprocessing. However, the pellets obtained both by the direct co-milling process and by the double co-milling process and which satisfy the requisite specifications are, with regards to the retention of products, particularly gaseous fission products forming during the irradiation of the fuel, far from having the desired properties. It has e.g. been revealed by FR-A-2 424 231 that the microstructure of sintered pellets and in particular the size of the grains has a major effect on the speed of escape of fission products, particularly gaseous products, during the irradiation of fuels.

Thus, a grain size between 20 and 40 $\mu$m (microns) would appear to be favourable to the retention of fission gases, whilst ensuring that the material still has a satisfactory flow or creep behaviour.

It is also known from GB-A-2 019 824, corresponding to FR-A-2 424 231, that it is possible to prepare sintered uranium dioxide pellets constituted by large grains. In the first stage of the process, a uranyl nitrate is reacted with a sulphur source in liquid form, reference being made solely to sulphuric acid, at a high temperature in order to form a uranium trioxide containing sulphur. Although this document reveals the influence of the presence of a sulphur compound on the crystal growth, it only relates to the preparation of uranium dioxide pellets and not MOX pellets and involves a reaction of the liquid sulphur compound with a uranyl nitrate. Therefore its teachings cannot be applied and easily transposed to the production of MOX pellets.

Finally, Japanese patent JP-A-62 115 398 describes the preparation of a nuclear fuel by mixing a powder of a single oxide chosen from among UO$_2$, ThO$_2$, PuO$_2$ or Gd$_2$O$_3$, the preparation of a fuel based on a mixture of oxides, more particularly of the MOX type, not being mentioned in this document. The only example relates to the preparation of a fuel based solely on UO$_2$.

An organic, sulphur product, more particularly ammonium sulphate, naphthyl amine sulphonic acid or xylene sulphonic acid is incorporated into the mixture for improving the retention of the fission gases and the interaction between the pellet and the can. The mixture is then moulded and generally preheated so as to melt the sulphur compound for incorporating it into the powder.

The pellet obtained has a heterogeneous structure with small diameter grains on the surface and large grains in the core of the pellet. The problem of improving the dissolving aptitude and in particular the aptitude for nitric dissolving of the fuel is not mentioned in this document, where no reference is made to the solubility of the fuel.

This document only relates to the preparation of pure uranium dioxide pellets, so that its teachings cannot easily be transported to the production of MOX pellets.

The milling or double co-milling processes described hereinbefore relating to the production of mixed oxide pellets lead to the obtaining of much smaller grain sizes of approximately 3 to 10 $\mu$m. There is consequently a need for a process making it possible to obtain a fuel based on mixed oxide and not only uranium dioxide having a larger grain size, the pellets obtained also having an excellent aptitude for nitric dissolving, as well as an excellent aptitude for dry grinding and complying with all the specifications involved for said pellets.

Therefore the present invention aims at providing a process able to satisfy these needs.

These and further objectives are satisfied by the invention by means of a process for the production of nuclear fuel pellets based on mixed uranium and plutonium oxide from a $UO_2$ and $PuO_2$ charge by pelletizing and sintering, characterized by the introduction in connection with the co-milling of the powders of a solid, organic, sulphur additive of the zwitterion type.

Thus, the process according to the invention, in a first variant, involves the following stages:

a) dosing a first mixture of $UO_2$ and $PuO_2$ powders having a plutonium content above the specified content with the incorporation of a solid, organic, sulphur product of the zwitterion type, b) milling said first mixture of milled powders, c) forced screening of this milled mixture through a screen having openings equal to or smaller than 250 μm, d) addition of a $UO_2$ powder to said first mixture of milled powders to obtain a second mixture of powders having the specified plutonium content and e) mixing by simply stirring up the complete charge in order to collect the powder charge, which will then undergo the lubrification, pelletizing, sintering and optionally grinding operations.

In this first variant of the process, through the addition of a solid, organic, sulphur product of the zwitterion type in stage a), it is possible to surprisingly improve the homogeneity of distribution of the plutonium within the mixture. Therefore a simple mechanical stirring (stage e) is sufficient to obtain, after pelletizing and sintering, a fuel complying in all points with the requisite specifications and without it being necessary to carry out a second milling. Thus, the forced screening stage for eliminating agglomerates formed during milling is no longer carried out on the complete charge, but instead on the primary mixture. Moreover, this organic, sulphur product makes it possible to obtain a larger grain size of approximately 20 to 60 μm on the high plutonium content zones releasing the greatest fission gas quantities. In this process, only the mother mixture zones are affected by the presence of the organic, sulphur additive, the remainder of the mixture having a smaller grain size guaranteeing the good creep behaviour of the pellet.

In a second variant, the process according to the invention comprises the following successive stages:

a) dosing a first mixture of $UO_2$ and $PuO_2$ powders and optionally recycling powder having the specified plutonium content with the incorporation of a solid, organic, sulphur product of the zwitterion type, b) milling said first powder mixture in order to obtain a powder charge which then undergoes lubrification, pelletizing, sintering and optionally grinding.

It should be noted that in the case of the second variant of the process, where milling takes place directly in the desired proportions to obtain the specified plutonium level, the addition of a sulphur additive to the complete charge to be pelletized makes it possible to increase the size of the grains over the complete pellet which is 20 to 40 μm.

In both variants of the process, in stage a) and/or in stage d), it is also possible to add a mixed oxide $(U, Pu)O_2$ recycling powder obtained by milling production waste. Through the addition of said recycling powder following the milling of the first mixture, it is possible to achieve high recycling levels. However, the added recycling powder quantity is preferably at the most 15 wt. % of said second mixture.

Preferably, said powder is obtained by milling pellets disposed of as waste. This milling can be carried out for at least six hours in an alloyed uranium, e.g. uranium-titanium, ball mill and the powder obtained is screened to a size of at the most 150 μm.

Other features and advantages of the invention can be better gathered from the following description given in an illustrative and non-limitative manner with reference to the attached drawings, wherein show:

FIGS. 1 and 2, already described, diagrams representing stages of the prior art, pellet production process.

FIG. 3 A diagram showing the stages of the pellet production process according to the first variant of the invention.

Figure 4:
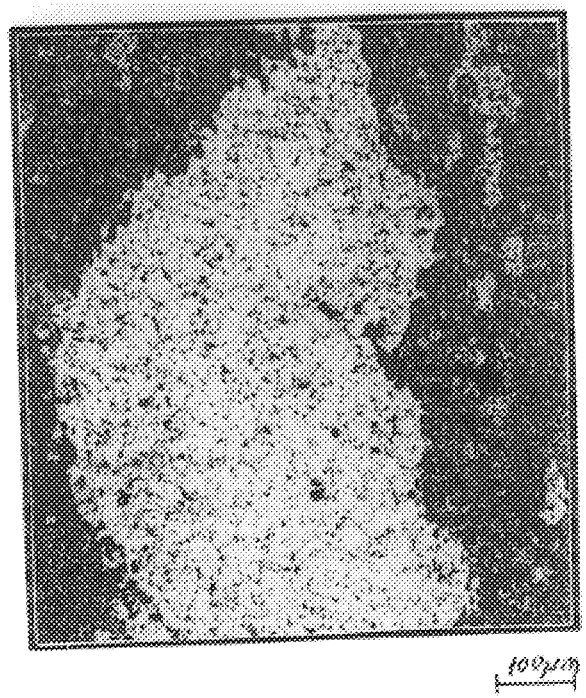
Figure 5:
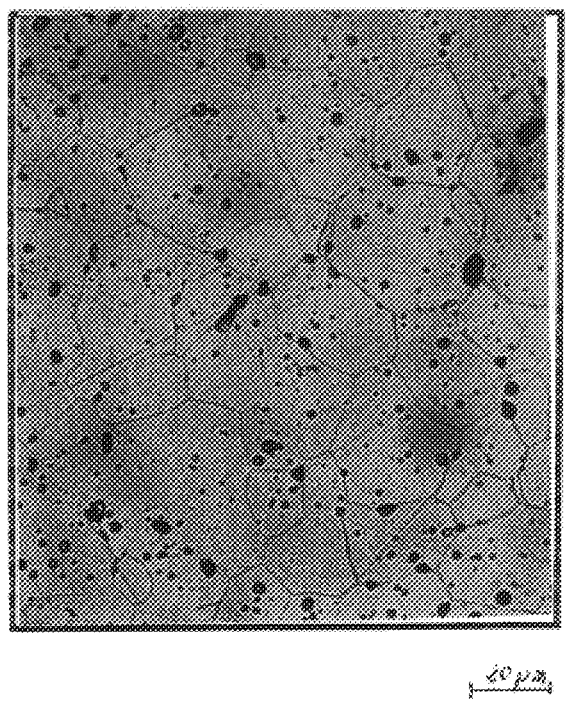

FIGS. 4 & 5 Microstructural observations of MOX pellets produced according to the first variant of the production process according to the invention.

Figure 6:
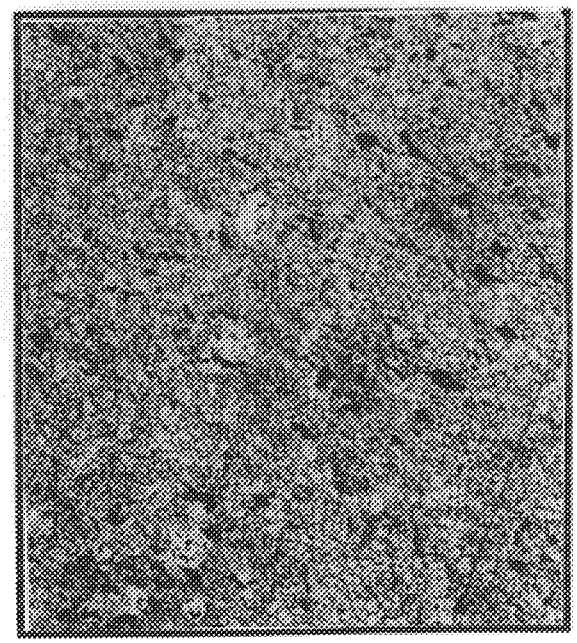
Figure 7:
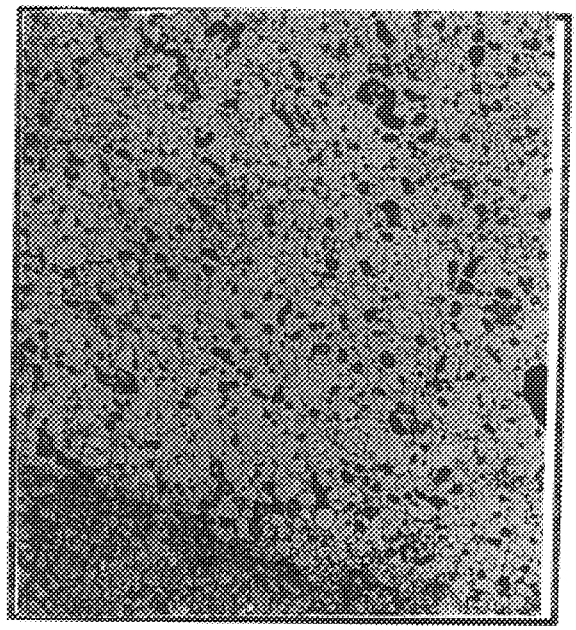

FIGS. 6 & 7 Microstructural observations of MOX pellets produced according to the prior art production process known as the standard MIMAS process (FR-A-2 622 343).

Figure 8:
Figure 9:
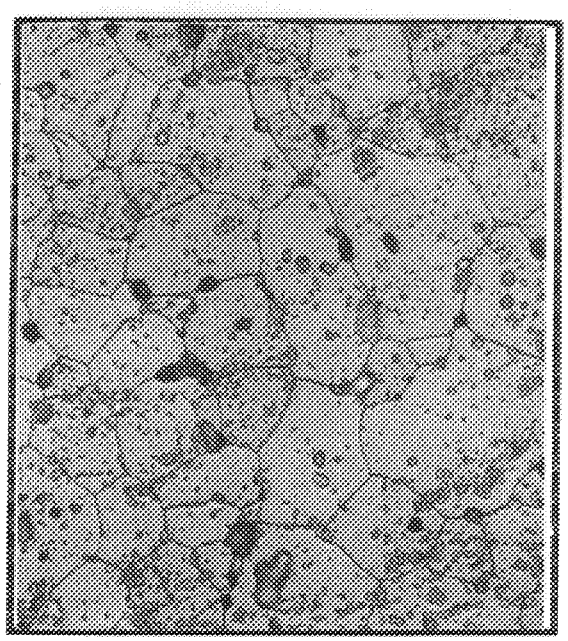

FIGS. 8 & 9 Microstructural observations of MOX pellets produced according to the second variant of the production process of the invention.

Figure 10:
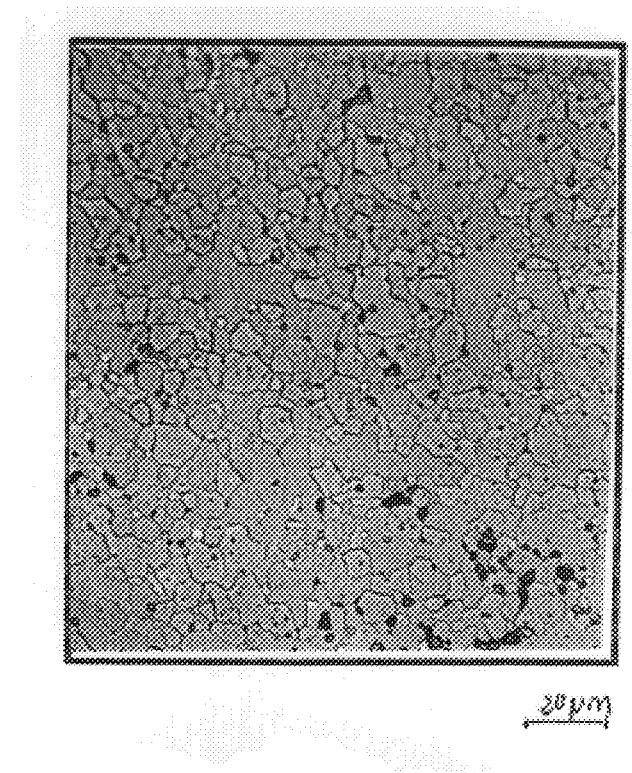
Figure 11:
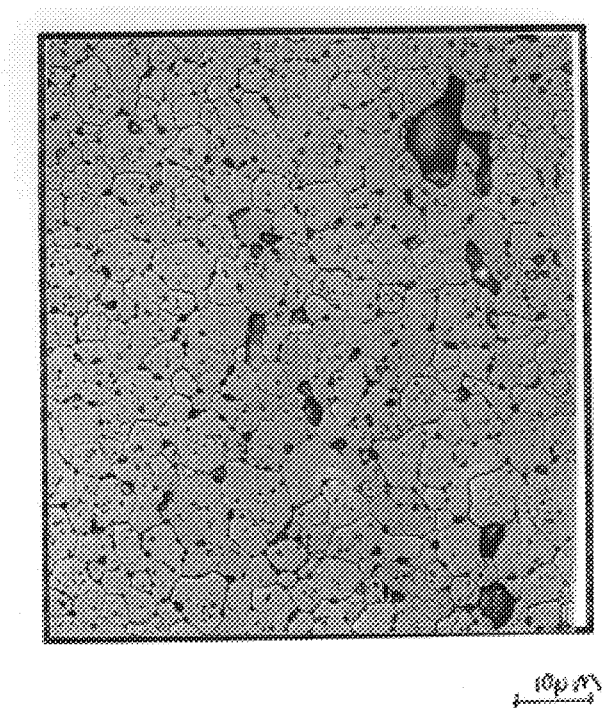

FIGS. 10 & 11 Microstructural observations of MOX pellets produced according to the prior art, standard COCA production process.

With reference to FIG. 3, it can be seen that the process according to the invention, in its first variant, comprises three prior stages leading to the obtaining of a second mixture of powders having the specified plutonium content and from which pelletizing and sintering subsequently take place.

The first stage consists of dosing $PuO_2$ and $UO_2$ powder batches to obtain a first mixture having the desired isotopic composition, but a plutonium content higher than the specified content, which respecting a certain homogeneity. This can only be obtained through the prior knowledge of the characteristics of all the $PuO_2$ powder batches used. For this dosing, the different constituents are weighed with a relative precision exceeding $1/1000$ in order to form a $PuO_2$—$UO_2$ powder mixture having a plutonium content higher than the specified content, but whose plutonium enrichment preferably still exceeds 25 wt. % and in particular between 25 and 30 wt. %. The organic additive is then added at a concentration preferably between 0.1 and 1 wt. %. This organic, sulphur additive is, according to the invention, added in the solid state.

This additive is in the form of a specific, polarized molecule, particularly a molecule of the zwitterion type, such as e.g. the dimethyl-dodecylammonio-propane sulphonate of empirical formula $C_{17}H_{37}NO_3S$, which is preferred. However, the claimed process, unlike that described in GB-A-2 019 824, introduces the organic, sulphur additive in the solid state during the dry co-milling stage of the first mixture, liquid addition introduction should be avoided in $UO_2$—$PuO_2$ mixture production stages for safety-criticality reasons. Thus, hydrogenated products (such as water) have a moderating effect, i.e. they can favour an uncontrolled, chain fission reaction (criticality accident).

The organic, sulphur, solid additive molecule of the zwitterion type also has a high molecular weight and the unexpected capacity to easily absorb on the surface $UO_2$ and $PuO_2$ powders and to serve as a lubricant, which makes it possible to improve and facilitate to a surprising extent the milling of the powder. Thus, it is possible to bring about a satisfactory mixing by simply mechanically milling the sulphur element and the mixture obtained has a high homogeneity.

Therefore the pellets prepared have a better dissolving aptitude, particularly nitric dissolving aptitude, than e.g. pellets prepared by a process not involving the addition of an organic, solid, sulphur, zwitterion additive in accordance with the invention or which use some other sulphur additive.

Moreover, the solid, sulphur additive has the supplementary advantage of being incorporatable in a very small quantity, e.g. a weight concentration of 0.1 to 1.% $C_{17}H_{37}NO_3S$ equivalent to the introduction of 95 to 950 ppm of the sulphur element into milled powders, which complies with nuclear safety conditions.

If appropriate, the $PuO_2$ powders can be calcined prior to introduction into the mixture. They generally have an average grain size of 0.5 to 40 $\mu$m and come from irradiated fuel reprocessing installations. The $UO_2$ powders used can have average grain sizes of 50 to 1000 $\mu$m. They are generally obtained by a chemical process from uranyl nitrate or uranium hexafluoride, or by the dry method from uranium hexafluoride.

After dosing the first mixture of $UO_2$—$PuO_2$ powders, there is a second milling stage making it possible to homogenize said first mixture and obtain a finer powder. This generally takes place in a hard material ball mill, e.g. metallic or alloyed uranium, or steel. This mill can e.g. have a volume of 60 liters and a ball charge of 350 kg. In general, milling takes place for 3 to 6 hours. The milling operation forms agglomerates leading to a very widely spread grain size spectrum of the mixtures from the mill ranging from a few um to more than 1 mm.

Any type of mill can be used for this milling operation, e.g. an attrition mill or an air jet mill.

The milling and dosing stages according to the second variant of the process only differ from the first variant in that in the first dosing stage, direct mixing takes place of the desired quantities of $UO_2$, $PuO_2$ and optionally recycling powders in order to obtain the specified plutonium content, which is preferably between 1 and 10 wt. %.

According to the second variant of the process, the second milling stage is performed in the same way as in the process according to the first variant, the powder charge obtained at the end of said milling undergoing lubrification, pelletizing and optionally grinding operations under the same conditions as for the first process variant. In the second process variant, the milled powder from the second stage can optionally undergo a granulation treatment and this is e.g. the case if the pourability of the milled powder is inadequate in order to ensure a supply under good conditions for the pelletizing equipment, even though said milled powder must be transformed into a denser and roughly spherical product usually known as granules, which are generally obtained by compacting and then breaking up in crushers and screening, leading to a given grain size range. This granulation treatment is known and the conditions for the performance thereof can be easily determined.

The following stage according to the first variant of the process according to the invention consists of a forced screening of the mixture through a screen having openings with a size equal to or smaller than 250 $\mu$m (microns) in order to hold back the fraction having a grain size equal to or smaller than 250 $\mu$m. This operation makes it possible to calibrate the powder dimensions and thus obtain a powder having the desired characteristics for pelletizing.

Thus, as stated hereinbefore, the grain size ranges of mixed powders in ball mills are generally very broad ranging from a few um to more than 1 mm. By forced passage in a screen having openings equal to or smaller than 250 $\mu$m, elimination takes place of the largest agglomerates, so as to collect a calibrated powder usable for the subsequent stages.

This operation is followed by the dosing of the second powder mixture by adding $UO_2$ powder to the first milled and calibrated powder mixture, which amounts to diluting the first milled and calibrated power mixture with $UO_2$ in order to obtain a second powder mixture having the specified plutonium content. In this stage, the added $UO_2$ powder is weighed with a relative precision exceeding $1/1000$.

In this stage it is also possible to add $(U, Pu)O_2$ (chamotte) powder resulting from the recycling of production waste. The added recycling powder preferably has isotopic characteristics (plutonium content) identical to those of the pellets to be prepared so as to be addable without taking any special precautions. However, it is possible to use a recycling powder having similar isotopic characteristics. When the recyling powder is obtained from production waste of the charge used, this causes no problem. When it comes from other recycling operations, account is taken of its physicochemical characteristics in order to carry out a dosing in accordance with the characteristics of the pellets to be prepared. As shown hereinbefore, the recycling powder can be obtained by milling waste pellets for at least six hours using a uranium-titanium ball mill and it is screened by passage through a screen with openings of at the largest 150 $\mu$m.

The following stage consists of mixing the mixture obtained after dosing using a mixer, which is generally of the ploughshare mixer type, for a period between 15 and 30 minutes. Any other mixer type can be used, in particular a conical screw mixer.

According to the process of the invention in its first variant, this mixing stage consists of a simple mechanical stirring, which is adequate for obtaining after pelletizing and sintering fuel pellets complying with the necessary specifications and having all the improved characteristic properties of the pellets of the invention. There is no need to perform a difficult, second milling operation involving a high energy consumption. As stated hereinbefore, according to the invention this is avoided by the addition of a solid, organic, sulphur product of the zwitterion type in stage a), which significantly improves the distribution homogeneity of the plutonium within the mixture. A the $UO_2$ granules retain their integrity, the entire charge used for pelletizing is pourable, which facilitates the filling of matrixes during the subsequent compression stage.

The following stages of lubrification with optional addition of a gas developing agent, pelletizing, sintering and grinding are carried out in known manner, e.g. in accordance with FR-A-2 424 231 and are carried out in the same way and under the same conditions for the first and second variants of the process according to the invention.

The lubrification stage can then be carried out using e.g. as the lubricant calcium or zinc stearate in a proportion equal to or below 0.5 wt. %. Mixing can take place in one or more successive operations with a mixing period dependent on the equipment used. This period is chosen so as to give the mixture a satisfactory homogeneity. The lubricant used, e.g. zinc stearate, is preferably baked and then screened using a 50 $\mu$m screen in order to eliminate agglomerates.

In the case where the density of the sintered pellets obtained from this powder charge is excessive compared with the necessary specifications, to the powder is added a gas developing agent, e.g. azodicarbonamide.

In this case, the gas developing agent is introduced at the same time as the lubricant mixing it appropriately with the latter in adequate proportions, followed by baking and screening by passing through a screen with a mesh size of 50 μm. The gas development agent content can be between 0.01 to 0.5 wt. % of the powder mixture.

The pelletizing stage can be carried out using a hydraulic press, whose parameters have been optimized and controlled, and in accordance with the geometrical and appearance characteristics of the pellets obtained by regular sampling operations. The pellets in accordance with the specifications are directly charged in bulk into sintering scoops limiting to the strict minimum the impacts and friction involved and controlling the quantity of pellets per scoop in such a way that it is essentially the same in each of the scoops.

The sintering stage is carried out as quickly as possible after pelletizing, so as to limit the effects of radiolysis of the lubricant and optionally the gas developing agent on the crude pellets.

As in the prior art, sintering takes place at a temperature of 1650° to 1750° C., preferably 1670°±20° C., in a reducing gas atmosphere, e.g. in a hydrogen-argon mixture containing 7% hydrogen. Preferably, the sintering atmosphere is humidified so as to improve the metallurgical diffusion of the materials present and stabilize the O/M ratio of the mixed oxide to a value close to 2.00.

The $H_2O/H_2$ ratio of the sintering atmosphere is limited and controlled so as to avoid oxidations of the heating elements and the sintering scoops, which are generally made from molybdenum.

After sintering, the pellets can undergo grinding, which can take place on a centreless, dry grinder in order to obtain pellets satisfying the diameter specification.

The pellets obtained by the process according to the invention in its first variant generally have the following characteristics. A high, bimodal grain size. The size of the grains is evaluated on micrographs obtained by optical microscopy on a previously sectioned, polished pellet, which has undergone chemical etching. Selective chemical etchings make it possible to evaluate the size of the grains in zones having high plutonium contents. In said zones affected by the presence of the organic, sulphur additive, measurement takes place of a high grain size exceeding 20 μm, the remainder of the pellet having a conventional grain size not exceeding 10 μm. A very satisfactory dissolving aptitude. The insoluble plutonium quantity after dissolving the pellet in an aqueous, 10N nitric acid solution boiling for 10 hours related to the total plutonium quantity quantifies this property. The insoluble Pu/total Pu ratio is equal to or below 0.25 wt. %. A residual sulphur content in the pellets below 20 ppm per unit mass.

The pellets obtained by the process according to the invention in its second variant generally have substantially identical characteristics, the high grain size being obtained on the entire pellet, whereas in the comparable process described e.g. in JP-A-62 115 398 the pellet has small diameter grains on the surface and large grains in the core.

The following examples given in a non-limitative manner, illustrate the results obtained by performing the process of the invention in its first variant (example 1) and in its second variant (example 2).

EXAMPLE 1

Dosing firstly takes place of the first mixture constituted by a 330 g charge having a 25 wt. % plutonium content, to which is added 0.6 wt. % of dimethyl-dodecylamminiopropane sulphonate ($C_{17}H_{37}NO_3S$).

This first mixture undergoes milling in a uranium ball jar for three hours. The primary mixture resulting from the milling operation is forced screened through a screen, whose aperture size is 250 μm. The calibrated mixture is then diluted by mechanical stirring in a ploughshare mixer for 30 minutes with the same $UO_2$ powder in order to obtain a second mixture of $UO_2$ and $PuO_2$ having a 6% $PuO_2$ content.

0.3 wt. % of gas developing agent (azodicarbonamide) and then 0.3 wt. % lubricant (zinc stearate) are mixed with the powder by mechanical stirring. The complete powder is then pelletized using a double action hydraulic press under a pressure of 500 MPa. The pellets obtained then undergo sintering at 1700° C., under a hydrogenated argon atmosphere (5% $H_2$), humidified with 2500 ppm of water.

The pellets obtained have the following characteristics:

size of grains of the plutonium rich zones between 20 and 50 μm, the remainder of the pellet having a grain size of 5 to 9 μm, an aptitude to nitric dissolving such that the insoluble Pu/total Pu=0.25 wt. %, a residual sulphur content lower than the detection limit of the analyzer, i.e. 20 ppm.

For comparison, sintered pellets obtained according to the prior art production process of FR-A-2 626 343 have a grain size of 2 to 8 μm for the plutonium rich zones and 5 to 10 μm for the remainder of the pellet.

The two types of microstructure are shown respectively in FIGS. 4 and 5 for the present invention and in FIGS. 6 and 7 for the prior art.

EXAMPLE 2

A 334 g powder charge with a $PuO_2$ content of 6% and constituted by a mixture of $PuO_2$, $UO_2$ and recycling powder is dosed at a level of 4 wt. %. The organic, sulphur additive dimethyl-dodecylammoniopropane sulphonate ($C_{17}H_{37}NO_3S$) is added at a rate of 0.6 wt. %. This mixture is milled under the same conditions as in example 1. The mixture is then directly lubricated and pelletized. The grain size evaluated on the complete sintered pellet then varies from 20 to 40 μm. For comparison purposes, pellets produced in the same way, but without an organic, sulphur additive in the mill, have a grain size of 6 to 14 μm.

The two types of microstructure are respectively shown in FIGS. 8 and 9 for the invention and in FIGS. 10 and 11 for the prior art.

The pellets prepared by said second variant of the process according to the invention do not suffer from the disadvantages of the pellets obtained by the prior art process such as cracking, appearance defects, etc. Therefore these pellets can be ground without any difficulty.

Thus, the process according to the invention not only makes it possible to obtain pellets meeting all the normally required specifications for nuclear fuel pellets based on mixed oxide (U, Pu)$O_2$, namely a good aptitude for dissolving, adequate densities and porosities, an excellent aptitude for dry grinding without the appearance of cracks, but also as a result of the addition of a sulphur compound, a larger grain size, particularly in the high plutonium content zones permitting a better retention of fission gases. The prior art processes give significantly smaller grain sizes favouring the escape of fission gases and the pellets obtained by the prior art processes have a significantly inferior dissolving aptitude, particularly a nitric dissolving aptitude.

The excellent results and improvements are obtained by implementing the process of the invention in both its first and second variants.

We claim:

1. Process for the production of nuclear fuel pellets based on mixed uranium and plutonium oxide having a specified plutonium content, from a $UO_2$ and $PuO_2$ powder charge by lubrification, pelletizing and sintering, in which the powder charge subject to lubrification, pelletizing and sintering is prepared by the following successive stages:

a) dosing a first mixture of $UO_2$ and $PuO_2$ powders having a plutonium content higher than the specified content, an organic, solid, sulphur product being incorporated into the mixture, b) milling said first mixture of powders, c) forced screening of said milled mixture through a screen having openings with a size equal to or smaller than 250 μm, d) addition of a $UO_2$ powder to said first mixture of milled powders to obtain a second mixture of powders having the specified plutonium content and e) mixing the complete charge for collecting the powder charge which is to undergo the lubrification, pelletizing and sintering operations, characterized in that the solid, organic, sulphur product incorporated into the mixture during stage a) is a zwitterion and in that stage e) of mixing the charge is a simple stirring operation.

2. Process for the production of nuclear fuel pellets based on mixed uranium and plutonium oxide having a specified plutonium content, from a $UO_2$ and $PuO_2$ powder charge by lubrification, pelletizing and sintering, in which the powder charge subject to lubrification, pelletizing and sintering is prepared by the following successive stages:

a) dosing a first mixture of $UO_2$ and $PuO_2$ powders having the specified plutonium content, an organic, solid, sulphur product being incorporated into the mixture, b) milling said first mixture of powders, characterized in that the solid, organic, sulphur product incorporated into the mixture during stage a) is a zwitterion.

3. Process according to claim 1, characterized in that the plutonium content of the first mixture exceeds 25 wt. %.

4. Process according to claim 2, characterized in that the plutonium content of the first mixture is between 1 and 10 wt. %.

5. Process according to claim 1, characterized in that in stage a) and/or in stage d), addition also takes place of a mixed $(U, Pu)O_2$ recycling oxide powder having the specified plutonium content obtained by milling production waste.

6. Process according to claim 1, characterized in that the mixing of stage e) is performed in a conical screw mixer.

7. Process according to claim 1, characterized in that the mixing of stage e) is performed in a ploughshare mixer.

8. Process according to claim 1, characterized in that the milling of stage b) is performed in a ball mill for 3 to 6 hours.

9. Process according to claim 1, characterized in that the organic, sulphur product is incorporated in a concentration of 0.1 to 1 wt. %.

10. Process according to claim 5, characterized in that the added recycling powder quantity represents at the most 15 wt. % of the mixture.

11. Process according to claim 5, characterized in that the recycling powder is constituted by particles having grain sizes equal to or below 150 μm.

12. Process according to claim 1, characterized in that the organic, sulphur, solid product is dimethyl-dodecylammoniopropane sulphonate.

13. Process according to claim 1, characterized in that a gas developing agent is incorporated into the powder charge during lubrification.

14. Process according to claim 1, characterized in that pelletizing takes place with a hydraulic press.

15. Process according to claim 1, characterized in that sintering takes place at a temperature of 1650° to 1690° C. in an optionally humidified, hydrogenated atmosphere.

16. Process according to claim 1, characterized in that the sintered pellets undergo dry grinding.

17. Process according to claim 2, characterized in that in stage a), and/or in stage d), addition also takes place of a mixed $(U,Pu)O_2$ recycling oxide powder having the specified plutonium content obtained by milling production waste.

18. Process according to claim 2, characterized in that the milling of stage b) is performed in a ball mill for 3 to 6 hours.

19. Process according to claim 2, characterized in that the organic, sulphur product is incorporated in a concentration of 0.1 to 1 wt. %.

20. Process according to claim 17, characterized in that the added recycling powder quantity represent at the most 15 wt. % of the mixture.

21. Process according to claim 17, characterized in that the recycling powder is constituted by particles having grain sizes equal to or below 15 μm.

22. Process according to claim 2, characterized in that the organic, sulphur, solid product is dimethyl-dodecylammoniopropane sulphonate.

23. Process according to claim 2, characterized in that a gas developing agent is incorporated into the powder charge during lubrification.

24. Process according to claim 2, characterized in that pelletizing takes place with a hydraulic press.

25. Process according to claim 2, characterized in that sintering takes place at a temperature of 1650° to 1690° C. in an optionally humidified, hydrogenated atmosphere.

26. Process according to claim 2, characterized in that the sintered pellets undergo dry grinding.

* * * * *